(12) United States Patent
Harbs

(10) Patent No.: US 11,510,419 B2
(45) Date of Patent: Nov. 29, 2022

(54) METHOD FOR THE PRODUCTION OF A PRODUCT MASS

(71) Applicant: NETZSCH-Feinmahltechnik GmbH, Selb (DE)

(72) Inventor: Theron Harbs, Selb (DE)

(73) Assignee: NETZSCH-Feinmahltechnik GmbH, Selb (DE)

( * ) Notice: Subject to any disclaimer, the term of this patent is extended or adjusted under 35 U.S.C. 154(b) by 256 days.

(21) Appl. No.: 16/700,451

(22) Filed: Dec. 2, 2019

(65) Prior Publication Data

US 2020/0170278 A1 Jun. 4, 2020

(30) Foreign Application Priority Data

Dec. 3, 2018 (DE) .......................... 102018009471.6

(51) Int. Cl.
*A23G 1/00* (2006.01)
*A23G 1/12* (2006.01)

(52) U.S. Cl.
CPC ........... *A23G 1/0036* (2013.01); *A23G 1/125* (2013.01)

(58) Field of Classification Search
CPC ............................... A23G 1/0036; A23G 1/125
See application file for complete search history.

(56) References Cited

U.S. PATENT DOCUMENTS

| 7,736,685 | B2 * | 6/2010 | Parsons | ..................... A23G 1/12 426/631 |
| 10,383,343 | B2 * | 8/2019 | Harbs | ..................... B01F 7/022 |
| 2006/0117965 | A1 * | 6/2006 | Parsons | .................. A23G 1/042 99/495 |
| 2015/0118374 | A1 * | 4/2015 | Kruiver | ................ A23G 1/0036 426/487 |

(Continued)

FOREIGN PATENT DOCUMENTS

| DE | 000003512764 C2 | 11/1985 | |
| DE | 19835347 A1 * | 2/2000 | ............. A23G 1/125 |
| DE | 102010049680 B4 | 9/2013 | |

*Primary Examiner* — Tamra L. Dicus
(74) *Attorney, Agent, or Firm* — Whitmyer IP Group LLC

(57) ABSTRACT

A method for the production of a product mass, in particular a chocolate mass, as a basic mass for foodstuffs, with a plurality of ingredients and a recipe total fat content, using a conching device with a conching container, which can be opened and closed hermetically sealed. The method includes filling of the conching container with a low-fat partial mass, which includes at least a part of the plurality of ingredients and has a fat content which is smaller than the recipe total fat content. Furthermore, the method includes a first conching of the low-fat partial mass with a closed conching container and second conching of the low-fat partial mass with an opened conching container with simultaneous active drying of the low-fat partial mass. Before the second conching, the method includes an addition of a further part of the plurality of ingredients to the low-fat partial mass until a fat content is reached in the range from approximately 11% to approximately 17%. The method also includes liquefaction (Continued)

of the partial mass while adding the rest of the plurality of ingredients and mixing the latter with the low-fat partial mass to form a total mass representing the product mass, which at least essentially includes the recipe total fat content.

19 Claims, 2 Drawing Sheets

(56) References Cited

U.S. PATENT DOCUMENTS

2016/0100604 A1* 4/2016 Rubin ................. A23G 1/0009
    426/520
2019/0373910 A1* 12/2019 Harbs ................. A23G 1/0036

* cited by examiner

METHOD FOR THE PRODUCTION OF A PRODUCT MASS

TECHNICAL FIELD

The invention relates to a method for the production of a product mass as a basic mass for foodstuffs.

BACKGROUND

Such product masses, in particular chocolate masses, are often conched in a conching device (also referred to as a conche) during their production. Such conching is a central process step, which can decisively determine the quality and the taste of the end product. Ingredients of the product mass are mixed during conching in a manner known to the person skilled in the art and processed under the effect of compression and/or shearing forces. In the case of chocolate production for example, conching allows moisture and the other undesired substances such as for example acetic acid or aldehydes to be extracted from a basic mass, which contains for example cocoa mass, sugar, cocoa butter, milk powder.

Even when use is made of modern conching devices, the conching represents a time-intensive process step which, not least on account of the marked application of force on the mass to be conched, is accompanied by a high energy demand. If the conching is not carried out carefully and the moisture in the basic mass is not reduced sufficiently, sugar crystals may remain in the basic mass, which adversely affect its taste and rheological properties. The same applies to acids and other undesired substances, which remain in the basic mass due to inadequate conching. However, the conching cannot be carried out for an arbitrary length of time, because the temperature increase accompanying the conching otherwise leads to the development of caramel-like flavors, which are undesirable especially in the area of milk chocolates and are perceived by the consumer typically as a sign of low quality.

It has been shown that the moisture of the basic mass can be extracted much more quickly if so-called dry conching is employed, wherein a partial mass is first conched, which has a lower fat content than the final product mass. Following the dry conching, however, the properties of the partial mass are unsatisfactory both with regard to its taste and also with regard to its viscosity. Consequently, so-called liquefaction is carried out following the dry conching, whereby fat-containing ingredients such as for example cocoa butter or other fats are mixed with the partial mass. On cost grounds, and not least with regard to as low a fat content of the product mass as possible and therefore of the ultimately produced foodstuff, it is desirable to save fat-containing ingredients. In order to be able to achieve satisfactory rheological properties with regard to taste and mouth-feel, such as in particular a low viscosity, limits are however imposed on such savings.

SUMMARY

The problem underlying the invention, therefore, is to provide a method which permits the low-cost production of a product mass, in particular a chocolate mass, of high quality, in particular with regard to the rheological properties of the product mass.

According to the invention, the problem is solved by a method with the features of the independent claim. Developments of the invention are stated in the dependent claims.

According to the invention, a method is proposed for the production of a product mass with a plurality of ingredients and a recipe total fat content using a conching device with a conching container, which can be opened and closed hermetically sealed. The method comprises filling of the conching container with a low-fat partial mass, which comprises at least a part of the plurality of ingredients and has a percentage fat content which is smaller than the recipe total fat content. The method also comprises a first conching of the low-fat partial mass with a closed conching container and a second conching of the low-fat partial mass with an opened conching container with simultaneous active drying of the low-fat partial mass. Before the second conching, the method comprises adding a further part of the plurality of ingredients to the low-fat partial mass until a fat content is reached in the range from approximately 11% to approximately 17%. Furthermore, the method comprises liquefaction of the partial mass while adding the rest of the plurality of ingredients and mixing the latter with the low-fat partial mass to form a total mass representing the product mass, which at least essentially comprises the recipe total fat content.

Especially for the production of chocolate mass, use is typically made of milk powder, so that lactose is present in the corresponding product mass or in its ingredients. The latter is in the majority of cases at least partially in the amorphous state, in which the lactose binds fat contained in the milk powder. Milk powder with exclusively crystalline lactose, on the other hand, has in most cases a distinct caramel taste, which as already mentioned is undesirable. The effect of targeted crystallization of the amorphous lactose during the first conching is that the fat previously bound in the amorphous lactose is released. In order to crystallize the amorphous lactose, a certain amount of moisture must be present in the low-fat partial mass. If need be, therefore, an addition of at least 0.5% by weight (related to the total mass of the respective recipe) of a polar solvent to the low-fat partial mass takes place before the first conching of the low-fat partial mass. The polar solvent is in particular water. In combination with the following second conching with simultaneous active drying, the low-fat partial mass can then be dried in a sufficiently short time and with a high degree of energy efficiency, despite the addition of moisture that previously took place where necessary, in such a way that a product mass of high quality can be obtained. The second conching also permits effective deacidification of the low-fat partial mass. On account of the fat released by the crystallization of the lactose, the quantity of fat-containing ingredients which are added for the liquefaction of the partial mass can advantageously be reduced, as a result of which cocoa butter for example or other fats can be saved. In this way, despite a comparatively low fat content, a product mass with optimized rheological properties and in particular with a low viscosity can be produced, for which purpose larger quantities of added fat were conventionally required. Since the active drying can be carried out quickly and yet gently, clumping together of the low-fat partial mass can be avoided, such as can occur at excessively high temperatures and/or with very long dry conching times. Moreover, a product mass with a distinctive milk taste can be achieved, since the formation of caramel flavors can be avoided according to the invention.

The product mass can be a cocoa-based basic mass for foodstuffs, in particular a chocolate mass. Generally, it can be a product mass based on fat masses, which can be used for example for the production of luxury foodstuffs. The method can basically be used for product masses for which conching is advantageous and which contain in particular milk powder, for example milk creams, praline masses or suchlike. The product mass is different from pure milk powder. The ingredients comprise in particular cocoa mass, sugar (also and in particular non-preground sugar, for example granulated sugar), cocoa butter, milk powder and/or fat.

According to an embodiment, the conching device is a round conche with a conching tool, which is rotatable in a direction of rotation around a rotary axis. The conching container can comprise at least one outlet, which can be optionally opened and closed and leads for example to an exhaust air system and/or into the surroundings.

The fat content of the low-fat partial mass is preferably adjusted such that the first and the second conching involve conching according to the concept of dry conching. Within the scope of the invention, dry conching is understood to mean conching of a mass with a relatively low fat content. In other words, the fat content of the low-fat partial mass is much lower than the recipe total fat content and can for example be lower than the recipe total fat content by at least a tenth, at least a fifth, at least a quarter, at least a third or even at least half of the recipe total fat content. According to the invention, the low-fat partial mass can comprise at least granulated sugar and milk powder, for example already at least a large proportion of the milk powder, such as for example at least 80% or at least 90%, and at least approximately 25% of granulated sugar, which should be present in the liquefied total mass. According to the invention, a recipe can advantageously be used in which the milk powder contains predominantly or even exclusively amorphous lactose. For example, at least 70%, at least 80%, at least 90% or at least 95% of the lactose present in the milk powder is in the amorphous state. Since the method according to the invention can effectively prevent caramel flavors from arising, a product mass with a distinctive milk taste can be prepared, such as is perceived especially by consumers as high-quality.

According to the invention, a larger quantity of polar solvent can be added if need be, for example at least 0.7% by weight, at least 1.0% by weight, at least 1.2% by weight or even at least 1.5% by weight. The indication of % by weight for the polar solvent again relates to the total mass of the recipe. The polar solvent is advantageously drinking water, wherein aqueous solutions and/or deionized water can also be used. Moreover, it is also possible according to the invention to use at least essentially water-free polar solvent such as for example ethanol, wherein solvents are preferably used which bring about crystallization of lactose in the low-fat partial mass and are advantageously taste-neutral.

The first conching and/or the second conching can be carried out at a raised temperature relative to room temperature. The raised temperature can arise due to the heat of friction during conching. However, the conching device preferably comprises a heating device, which enables targeted heating of the mass to the conched. In a closed state of the conching container, the latter can be sealed in such a way that at least essentially no moisture exits from the conching container during the first conching and therefore a relative moisture content of the low-fat partial mass remains at least essentially constant during the first conching. This is important in order that the crystallization of the amorphous lactose desired according to the invention can take place. During the second conching, on the other hand, air and therefore also air humidity can be discharged from the conching container into the surroundings in an opened state of the conching container, so that the drying of the low-fat partial mass is enabled or the relative moisture content of the low-fat partial mass is reduced.

The active drying of the low-fat partial mass differs in particular from the mere conching with an opened conching container. The active drying can for example include an increased energy supply compared to the process operations during the first conching, said energy supply leading to an increased temperature of the low-fat partial mass. Furthermore, the active drying can include siphoning-off and/or a connection of an interior space of the conching container to a suction line, as a result of which moisture is discharged more quickly. It is also conceivable according to the invention for a water-permeable membrane or a hygroscopic material to be used for the active drying.

According to a preferred embodiment, the active drying comprises an at least temporary introduction of a drying gas into the conching container during the second conching. The active drying can thus be carried out in a particularly efficient manner. The drying gas can have a raised pressure compared to an ambient pressure, so that in other words it is a compressed gas. For example, the pressure can lie at least 0.05 bar, at least 0.1 bar, at least 0.2 bar or even a still greater value above the ambient pressure.

According to the invention, the addition of a further part of the plurality of ingredients to the low-fat partial mass takes place before the second conching. In particular, it is ensured by this addition of a further part of the plurality of ingredients that the fat content of the low-fat partial mass lies in a range from approximately 11% to approximately 17%. The second conching can take place particularly effectively with a fat content in the stated range. For example, the further part of the plurality of ingredients is a cocoa mass. According to the invention, the total cocoa mass or at least a large proportion of the cocoa mass of a recipe is added in particular before the second conching (inasmuch as cocoa mass is contained in the recipe).

During liquefaction, the remaining ingredients of the plurality of ingredients of the product mass, which had not previously been introduced, are in particular introduced into the conching container. These remaining ingredients are for example fat, in particular cocoa butter, and where appropriate flavors, additives, emulsifiers and suchlike. The low-fat partial mass and the remaining ingredients together formed the total mass. In other words, the remaining ingredients have a much higher fat content than the low-fat partial mass. The total mass can thus comprise the recipe total fat content up to tolerable, small deviations. The recipe total fat content can be adjusted in particular by the selection of the remaining ingredients and the metering thereof with a desired tolerance range.

According to a development of the invention, the low-fat partial mass is circulated in a direction of rotation during the first conching. This may be the direction of rotation of the aforementioned conching tool. The drying gas is preferably introduced into the conching container at least essentially tangential to the direction of rotation. Mixing of the low-fat partial mass and extraction of bitter substances is thus intensified. In addition, the drying gas is distributed particularly effectively in the conching container on account of the preferably tangential supply. In other words, the drying gas is preferably introduced into the conching container at least essentially tangential to a rotational path of the low-fat partial mass and/or of the conching tool. The drying gas can also be introduced into the conching container at least essentially tangential to a container wall of the conching container. The drying gas can be introduced in a supply direction into the conching container. The supply direction has a vector component running tangential to the direction of rotation. The term "at least essentially tangential" also includes in particular cases in which the supply direction additionally comprises a vector component running obliquely to the tangential vector component, but which is much smaller than the tangential vector component, in particular at least by a factor of two, at least by a factor of three, at least by factor of five or even at least by a factor of ten smaller.

According to the invention, the low-fat partial mass can be actively dried in a targeted manner and with a controlled temperature as a result of the tangential supply of the drying gas, so that a rapid and at the same time gentle drying of the low-fat partial mass is enabled. The conching device can comprise at least one supply channel, through which the drying gas can be fed to the conching container. An outlet of the supply channel, which forms an inlet of the conching container, can be arranged above or below a preset level for the low-fat partial mass. The outlet of the supply channel can be constituted nozzle-shaped.

According to an embodiment of the invention, hot air is used as a drying gas. Hot air can be produced easily, cost-effectively and in a well-controlled manner.

As a rule, the low-fat partial mass has an initial relative moisture content even before the addition of the polar solvent. According to the invention, it is proposed that an addition of the polar solvent to the low-fat partial mass increases if necessary the initial relative moisture content of the low-fat partial mass, wherein the second conching then leads to a reduction in the relative moisture content of the low-fat partial mass to a value below the initial moisture content of the low-fat partial mass. A total mass is thus obtained which has a desired low relative moisture content after the first and the second conching, although the polar solvent may have previously been added. In this way, the lactose can first be crystallized in a targeted manner and bound fat can be released, but then a dry low-fat partial mass with advantageously low moisture is obtained, which can be further processed into a high-quality product mass with favorable rheological properties. The initial relative moisture content can amount for example to at least 0.5% by weight or at least 1.0% by weight and/or at most 2.0% by weight, in particular at most 1.5% by weight. The addition of the polar solvent can markedly increase the relative moisture content of the low-fat partial mass. For example, the relative moisture content of the low-fat partial mass can be at least doubled, at least tripled or at least quadrupled by the addition of the polar solvent. Particularly in connection with the direct and/or tangential blowing-in of the drying gas, despite a temporarily markedly raised relative moisture content, the relative moisture content of the low-fat partial mass can be reduced to normal low values after the second conching. According to the invention, less time and/or energy expenditure is nonetheless required than was hitherto the case for this purpose.

Favorable rheological conditions of the total mass, which are associated especially by consumers with a high-quality product, can in particular be achieved when fine size-reduction of the total mass is carried out. Such fine size-reduction is often referred to as "refining" in English speaking countries. The fine size-reduction is carried out for example after cooling of the total mass following the liquefaction. Fine size-reduction may also be grinding.

A development of the invention makes provision such that the fine size-reduction is carried out in an agitator ball mill. The term "agitator ball mill" should also include mills, the grinding bodies whereof are not spherical. The inventors have recognized that the fine size-reduction can be carried out particularly effectively through the use of an agitator ball mill. A particle size can be reduced still further in a time-efficient manner using an agitator ball mill. Additional removal of moisture during the fine size-reduction can be dispensed with the present invention, since the second conching already permits extremely effective drying and deacidification of the low-fat partial mass.

The conching method according to the invention has the particular advantage that it is possible, without unfavorable effects, to make use of the fat content which is bound in the milk powder by amorphous lactose. It is therefore possible with the method according to the invention to markedly reduce the viscosity of a recipe, without having to add for this purpose a greater fat content as was commonly the case hitherto. Compared to conventional conching processes, the reduction in viscosity achieved with the method according to the invention amounts to 30%, 40% or even 50% and over. If, on the other hand, a specific viscosity of a product mass is specified as a target value, this viscosity can be achieved with the method according to the invention with a lower amount of fat to be added than was commonly the case hitherto, since the method according to the invention releases the fat content bound in the amorphous lactose. With the method according to the invention, it is thus possible to obtain a saving of approximately 2 to 3% fat related to the desired fat content of the total mass, in particular a saving in the range from 2 to 2.5% fat and in particular 2.3% fat. In the large-scale industrial production of milk chocolate, for example, such a fat saving represents a considerable cost advantage.

In other words, the method according to the invention either allows, with a recipe total fat content the same as conventional conching processes, a much smaller target or final viscosity of the product mass to be obtained, or a desired final viscosity with a lower recipe total fat content to be achieved than was usually the case hitherto. In the chocolate industry, for example, a specific target or final viscosity of the product mass is of great importance, since the final viscosity has a decisive influence on the rheological properties of the product mass, in particular on its flowability, and therefore on the possibility of further processing. Overcoat masses, for example, should as a rule have a lower viscosity, in order that they are more liquid and therefore better able to flow. On the other hand, a chocolate mass with a higher viscosity is preferred for bake-stable mixtures, in order that the chocolate does not run excessively during the baking. Milk chocolate as a rule has for example a target or final viscosity of approximately 3000 mPas.

Particularly effective crystallization of lactose can be achieved especially when the partial mass is heated in the first conching to a temperature of at least 55° C. or even at least 60° C. It has been shown that the crystallization of lactose and therefore the release of fat present in the milk powder take place very efficiently especially at temperatures above 55° C.

In the second conching, the temperature can be increased to a value above 60° C. or above 65° C., for example to a value of at least 70° C., at least 80° C. or at least 85° C. In particular, the active drying by means of the drying gas can thus be effectively assisted.

According to the invention, it is proposed moreover that an ingredient of the low-fat partial mass is granulated sugar. The use of granulated sugar has proved to be advantageous, since the latter absorbs less water than ground sugar and therefore permits much more efficient drying during the second conching. According to the invention, it is possible that the low-fat partial mass is at least essentially free from ground sugar such as for example powdered sugar. For example, a large proportion of or all of the added sugar is present in the form of granulated sugar.

According to a variant, the first conching is carried out over a period of at least 0.5 h, in particular of at least 1 h, and/or of at most 3 h, in particular at most 2 h. A comparatively short process step can thus be provided, which nonetheless permits crystallization of lactose on a considerable scale and thus enables a release of the fat bound in the amorphous lactose.

The low-fat partial mass can have a fat content of at least 5% and in particular of at least 10% and/or of at most 25% and in particular of at most 20%. For example, the fat content of the low-fat partial mass can lie between 11 and 17%. The aforementioned percentage data for the fat content of the low-fat partial mass are understood to include the fat content bound by the amorphous lactose. Percentage data relating to a fat content are to be understood here within the scope of the disclosure in particular as data in % by weight, in each case related to the corresponding mass (for example related to the low-fat partial mass, the total mass or the product mass).

As has been mentioned above, an ingredient of the product mass can be cocoa mass. In a variant of the method according to the invention, it is proposed that the low-fat partial mass is essentially free from cocoa mass in the first conching. The low-fat partial mass can comprise for example less than a fifth, less than a sixth, less than a seventh or even less than a tenth of the total cocoa mass. In other words, the low-fat partial mass thus initially comprises predominantly or only the "white" ingredients of the plurality of ingredients, whilst the cocoa ingredients such as cocoa mass and/or cocoa butter are not added until later. The cocoa mass or a large proportion thereof is advantageously added before the second conching. The first and the second conching thus permit particularly effective dry conching.

Large proportions of cocoa mass can thus already be present in the low-fat partial mass. In this case, only fat and/or cocoa butter as well as additives, flavoring substances, emulsifiers etc. can for example be omitted for the first and the second conching.

Costs for fat-containing additives can be saved to a considerable extent especially when the recipe total fat content amounts to at most 34%, in particular at most 32% and advantageously at most 29%. For example, it has been shown in tests that a recipe total fat content of approximately 32% is required for conventional conching, in order to achieve similar rheological properties and in particular similar final viscosities such as those with the method according to the invention with a recipe total fat content of approximately 29.5%.

BRIEF DESCRIPTION OF THE DRAWINGS

Further advantages and modes of operation of the invention emerge for the person skilled in the art from the following description and the appended drawings, in which preferred embodiments of the invention are represented by way of example. In the figures.

DETAILED DESCRIPTION

Figure 1:
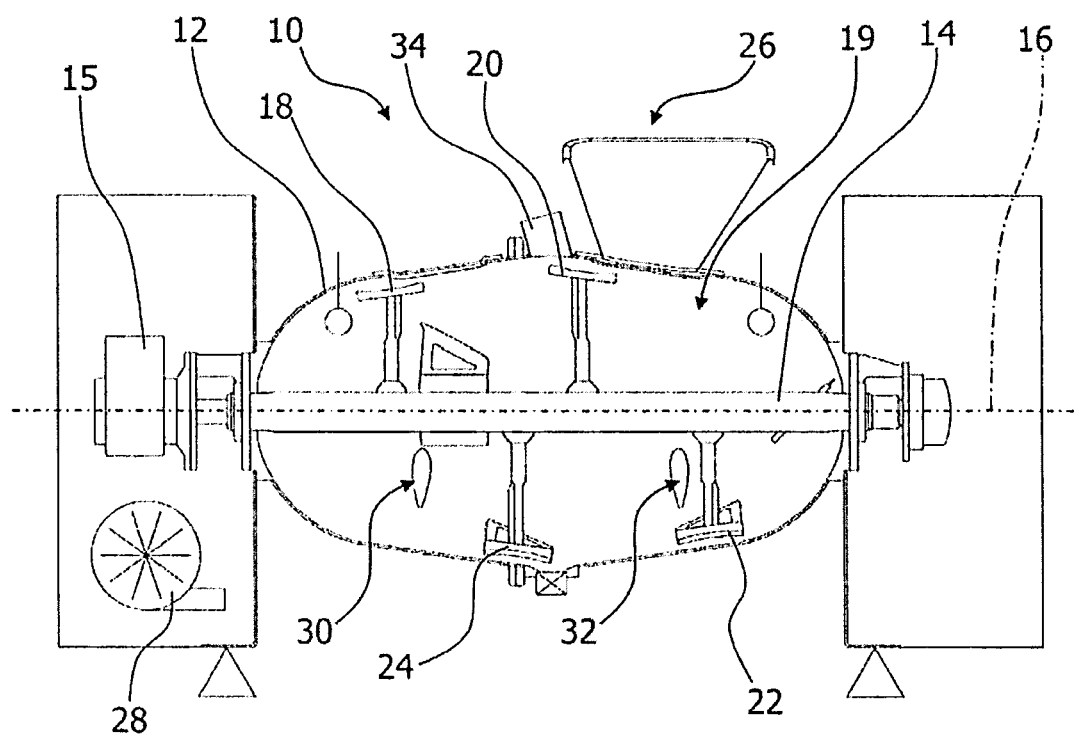
FIG. 1 shows a diagrammatic representation of a conching device, which is used to carry out a method according to the invention.

FIG. 1 shows a diagrammatic representation of a conching device 10 with a conching container 12, which can be used to carry out the method according to the invention. Conching device 10 comprises a drive shaft 14, which is connected to a drive unit 15 of conching device 10. Drive shaft 14 is mounted rotatably about a rotary axis 16. The drive shaft enters laterally into conching container 12. A plurality of conching tools 18-24 are fitted to drive shaft 14 which, when drive shaft 14 rotates, rotate along with the latter about rotary axis 16. Conching tools 18-24 move in a direction of rotation on a rotational path (not represented), which runs in the shape of a circle around rotary axis 16. Furthermore, conching tools 18-24 move along a container inner wall 19. Conching device 10 also has a filling funnel 26, which permits filling of ingredients of a mass to be conched into conching container 12.

Conching device 10 further comprises a blowing unit 28, which is designed to generate a flow of a drying gas. The drying gas in the case represented is pressurized hot air. Blowing unit 28 is designed to provide the drying gas with an excess pressure of approximately 0.1 to 0.3 bar compared to an ambient pressure.

Furthermore, conching container 12 is provided with inlets 30, 32, which are connected by supply channels (not represented) to blower unit 28. The drying gas can be introduced through inlets 30, 32 into an interior space of conching container 12. Inlets 30, 32 are arranged in such a way that the drying gas is blown into conching container 12 at least essentially tangential to the direction of rotation of conching tools 18-24. The drying gas is introduced into conching container 12 through inlets 30, 32 at least essentially tangential to container inner wall 19.

The embodiment with inlets 30, 32 is to be understood by way of example. The person skilled in the art will also consider alternative embodiments, in which for example one or more nozzles are used, which permit the targeted directing of a flow of the drying gas introduced into conching container 12.

In addition, conching container 12 comprises an outlet 34, which can be opened and closed. Outlet 34 can for example be opened when drying gas is admitted into conching container 12, so that the drying gas and any removed substances and/or evaporated solvent such as for example water or suchlike can be discharged from the interior of conching container 12.

Figure 2:
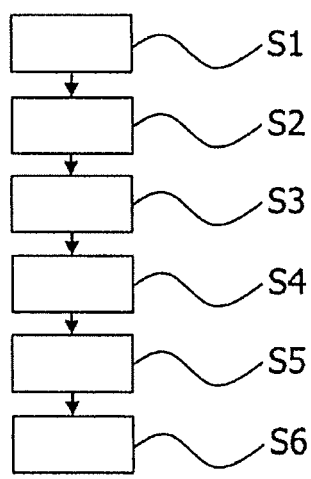
FIG. 2 shows a flowchart of the method according to the invention.

FIG. 2 shows a diagrammatic flowchart of a method according to the invention for producing a product mass as a basic mass for foodstuffs. In the example of embodiment represented, the product mass is a chocolate mass, which comprises a plurality of ingredients. In the case show, these ingredients are at least granulated sugar, cocoa mass, milk powder and cocoa butter. The product mass has a recipe total fat content which results from the respective fat content and respective proportion by weight of the plurality of ingredients of the product mass in its produced state. The recipe total fat content can amount for example to approximately 29%. The recipe total fat content therefore lies much lower than with previously used recipes for a product mass with similar rheological properties and in particular similar final viscosity.

In a first process step S1, conching container 12 of conching device 10 is filled with a low-fat partial mass, which comprises at least a part of the plurality of ingredients and which has a fat content which is less than the recipe total fat content. In a first variant of the method, the low-fat partial mass is at least essentially free from cocoa mass. The low-fat partial mass then primarily contains the "white" ingredients of the product mass. In a second variant of the method, on the other hand, the low-fat partial mass can already comprise a considerable amount of cocoa mass. In both variants, the low-fat partial mass contains granulated sugar and milk powder, preferably all the granulated sugar and all the milk powder that is to be present in the produced product mass. The milk powder contains predominantly or even exclusively lactose in amorphous form. In the example represented, the low-fat partial mass can be described as a defatted chocolate mass. In order to adjust the fat content of the low-fat partial mass much lower than the recipe total fat content of the product mass, the low-fat partial mass in the example shown contains much less cocoa butter and/or fat than the product mass. In the example shown, the fat content of the low-fat partial mass thus lies between 10% and 20% and depending on the recipe can amount for example to 15%.

Figure 3:
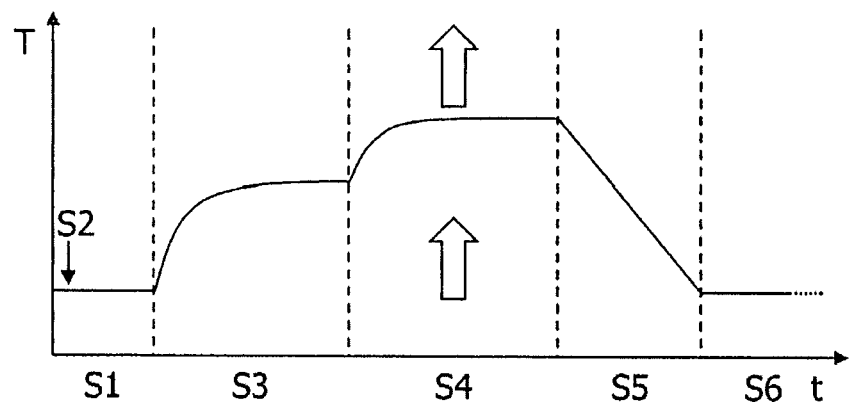
FIG. 3 shows an exemplary diagram, which represents schematically a temporal temperature course during the method according to the invention.
Figure 4:
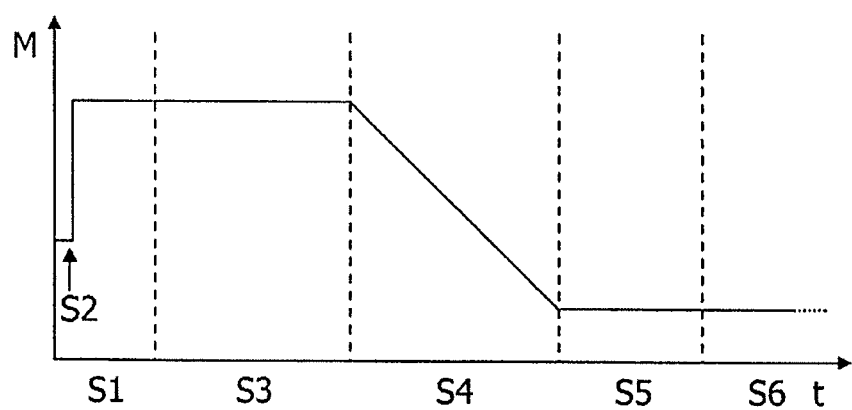
FIG. 4 shows an exemplary diagram, which represents schematically a temporal course of a relative moisture content during the method according to the invention.

Reference is also made to FIGS. 3 and 4 in the following, which represent schematic diagrams of a temporal temperature course and a temporal course of a relative moisture content of the mass currently being processed. Here, t denotes time, T the temperature and M the relative moisture content.

In a second process step S2, a polar solvent is added to the low-fat partial mass in a quantity of at least 0.5% by weight. The polar solvent here is water. Depending on the recipe specifically used, 1.0% by weight or 1.5% by weight of water for example is added. The polar solvent is then mixed with the low-fat partial mass. As can be seen in the diagram of FIG. 4, the relative moisture content of the low-fat partial mass increases markedly with the addition of the polar solvent. In the case shown, the relative moisture content of the low-fat partial mass is roughly doubled or tripled by the addition of the polar solvent.

In a third process step S3, conching container 12 is closed and a first conching of the low-fat partial mass takes place with closed conching container 12. The first conching is carried out over a period of approximately 0.5 to 3 h. On account of the closed state of conching container 12, the relative moisture content of the low-fat partial mass remains essentially constant during the first conching (see FIG. 4). On account of the comparatively high relative moisture content of the low-fat partial mass during the first conching, the amorphous lactose present in the low-fat partial mass crystallizes, as a result whereof fat which is present bound in the amorphous state of the lactose and which is contained in the milk powder can be released.

The low-fat partial mass is heated during the first conching to a temperature of at least 55° C. and in particular of at least 60° C. (see FIG. 3). The heating takes place gradually during the first conching, which is represented diagrammatically in FIG. 3 by the course of the curve. The temporal course represented in FIG. 3 is however to be understood purely by way of example. In particular, a target temperature for the first conching can be reached much earlier than is suggested by FIG. 3.

After the first conching, an addition of a further part of the plurality of ingredients to the low-fat partial mass takes place until a fat content is reached in the range from approximately 11% to approximately 17%. In particular, the cocoa mass or a large part thereof is now added.

In the fourth process step S4, conching container 12 is then opened and a second conching of the low-fat partial mass takes place with simultaneous active drying of the low-fat partial mass. In the example represented, the second conching is carried out over a period of several hours such as for example approximately 2 hrs or approximately 4 hrs. During the active drying, a drying gas is introduced into conching container 12. This is illustrated by the lower arrow in step S4 in FIG. 3. In the example of embodiment shown, the drying gas is provided by blowing unit 28. Hot air is used as a drying gas. The drying gas is blown directly into the low-fat partial mass, while the latter is being conched. The drying gas, as described above, is introduced into conching container 12 at least essentially tangential to the direction of rotation of conching tools 18 to 24 and therefore at least essentially tangential to a direction of rotation of the circulated low-fat partial mass.

The second conching is carried out at a higher temperature than the first conching. In particular, the temperature of the low-fat partial mass increases in conching container 12 on account of the raised temperature of the supplied drying gas.

Since conching container 12 is opened during the second conching, moisture from the low-fat partial mass can exit into an interior space of the conching container and then be discharged from the latter, for example into an exhaust air system or into the surroundings. This is illustrated by the upper arrow in step S4 in FIG. 3. In particular, the added polar solvent is also hereby removed from the low-fat partial mass at least to a large extent. As a result of the active drying, the relative moisture content of the low-fat partial mass is reduced to a value which lies below the relative moisture content of the low-fat partial mass before the addition of the polar solvent, as can be seen in FIG. 4. The linear course of the diminishing relative moisture content represented in FIG. 4 is purely by way of example. Particularly at the start and towards the end of the second conching, this course can also diverge from a linear course.

In a fifth process step S5, the low-fat partial mass is liquefied with the addition of the remaining ingredients and with mixing thereof with the low-fat partial mass to form a total mass representing the product mass, which at least essentially has the recipe total fat content. In fifth process step S5, an addition of the fat content still lacking for example for milk creams or basically for liquefaction of the low-fat partial mass thus takes place. According to a first variant of the method, during the liquefaction, apart from fat and cocoa butter, the proportion of cocoa mass not yet present in the low-fat partial mass is also added. According to a second variant of the method, on the other hand, predominantly fat and/or cocoa butter are added. The liquefaction takes place in conching container 12 and in the presence of cooling of the low-fat partial mass or of the total mass, which is also represented schematically in FIG. 3.

In a sixth process step S6, the obtained total mass is fed to an agitator ball mill (not represented), by means of which fine size-reduction of the total mass takes place. A particle size of substances present in the liquefied total mass, such as for example a particle size of the granulated sugar and of the crystallized lactose, is thereby markedly reduced. A viscosity of the product mass obtained after the fine size-reduction then amounts for example to at most 4000 mPs and in particular at most 3500 mPs. If need be, a still lower viscosity can be achieved in that more fat is added during the liquefaction.

Depending on the recipe used, it is also conceivable for certain product masses for the step of fine size-reduction to be completely dispensed with.

It is clear to a person skilled in the art that some of the described features and process steps can be suitably modified, repeated or omitted, for example in order to obtain specifically determined desired properties of a product mass. As was mentioned above, other kinds of active drying are also conceivable. Moreover, the method according to the invention can also be used for product masses which do not involve chocolate masses. Here too, the person skilled in the art will carry out appropriate adaptations of the described exemplary method in a suitable manner. The person skilled in the art will also recognize that represented conching device 10 merely represents a possible example of a suitable conching device and that other geometries, conching tools and arrangements of components can be used according to the invention.

The invention claimed is:

1. A method for the production of a product mass as a basic mass for foodstuffs, wherein the product mass includes a plurality of ingredients and has a total fat content, the method comprising the steps:
   using a conching device which includes a conching container;
   filling the conching container with a low-fat partial mass, said low-fat partial mass includes a part of the plurality of ingredients and has a fat content which is smaller than the total fat content;
   closing the conching container to be sealed;
   first conching the low-fat partial mass with the conching container which is closed;
   opening the conching container and adding another part of the plurality of ingredients to the low-fat partial mass until a fat content is reached in a range from approximately 11% to approximately 17%, thereby forming an intermediate mass;
   second conching the intermediate mass with the conching container, said second conching is performed with the conching container being open and with simultaneous active drying of the intermediate mass;
   liquefying the intermediate mass while the rest of the plurality of ingredients is added and mixed with the intermediate mass to form a total mass representing the product mass, which includes the total fat content.

2. The method according to claim 1, wherein a drying gas is introduced into the conching container during the second conching.

3. The method according to claim 2, wherein the low-fat partial mass is circulated in a direction of rotation during the first conching, and wherein the drying gas is introduced into the conching container at least essentially tangential to the direction of rotation.

4. The method according to claim 2, wherein the drying gas is blown directly into the intermediate mass.

5. The method according to claim 2, wherein hot air is used as the drying gas.

6. The method according to claim 1, wherein an addition of at least 0.5% by weight of a polar solvent to the low-fat partial mass takes place before the first conching of the low-fat partial mass.

7. The method according to claim 6, wherein the low-fat partial mass has an initial relative moisture content before the addition of the polar solvent, wherein the addition of the polar solvent to the low-fat partial mass increases the relative moisture content of the low-fat partial mass, and wherein the second conching leads to a reduction in the relative moisture content of the low-fat partial mass to a value below the initial relative moisture content of the low-fat partial mass.

8. The method according to claim 1, wherein size-reduction of the total mass is carried out after the formation of the total mass.

9. The method according to claim 8, wherein the size-reduction is carried out in an agitator ball mill.

10. The method according to claim 1, wherein the low-fat partial mass is heated in the first conching to a temperature of at least 55° C.

11. The method according to claim 1, wherein said part of the plurality of ingredients of the low-fat partial mass includes granulated sugar.

12. The method according to claim 1, wherein the first conching is carried out over a period from 0.5 h to 3 h.

13. The method according to claim 1, wherein the low-fat partial mass has a fat content from 5% to 25%.

14. The method according to claim 1, wherein the plurality of ingredients of the product mass includes a cocoa mass, and wherein said part of the plurality of ingredients of the low-fat partial mass is essentially free of the cocoa mass during the first conching.

15. The method according to claim 14, wherein the cocoa mass is added during the addition of said another part of the plurality of ingredients to the low-fat partial mass.

16. The method according to claim 1, wherein the total fat content amounts to at most 34%.

17. The method according to claim 10, wherein the temperature is at least 60° C.

18. The method according to claim 1, wherein the first conching is carried out over a period from 1 h to 2 h.

19. The method according to claim 1, wherein the low-fat partial mass has a fat content from 10% to 20%.

* * * * *